(12) United States Patent
Lin et al.

(10) Patent No.: US 11,277,168 B2
(45) Date of Patent: Mar. 15, 2022

(54) COMMUNICATION DEVICE AND ECHO CANCELLATION METHOD

(71) Applicant: Realtek Semiconductor Corporation, Hsinchu (TW)

(72) Inventors: Wei-Ting Lin, Yunlin County (TW); Yuan-Jih Chu, Hsinchu (TW); Li-Chung Chen, Zhubei (TW); Hsin-Yun Hu, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/014,110

(22) Filed: Sep. 8, 2020

(65) Prior Publication Data

US 2021/0175924 A1    Jun. 10, 2021

(30) Foreign Application Priority Data

Dec. 6, 2019 (TW) .................................. 10814479.3

(51) Int. Cl.
*H04B 3/23* (2006.01)
*H04M 9/08* (2006.01)

(52) U.S. Cl.
CPC .............. *H04B 3/23* (2013.01); *H04M 9/082* (2013.01)

(58) Field of Classification Search
CPC .......... H04M 9/082; H04M 3/002; H04B 3/23
USPC ............................ 379/406.01, 406.1, 406.05
See application file for complete search history.

(56) References Cited

U.S. PATENT DOCUMENTS

| | | | | |
|---|---|---|---|---|
| 6,538,451 B1* | 3/2003 | Galli | ........................ | H04B 3/54 324/533 |
| 6,687,372 B1* | 2/2004 | Trump | ...................... | H04B 3/23 370/286 |
| 7,346,013 B2* | 3/2008 | Garmany | ................ | H04B 7/005 370/286 |
| 7,991,167 B2* | 8/2011 | Oxford | ................... | H04R 3/005 381/92 |
| 2003/0235295 A1* | 12/2003 | He | ........................... | H04B 3/23 379/406.01 |
| 2004/0001450 A1* | 1/2004 | He | ........................... | H04B 3/23 370/286 |
| 2007/0299622 A1 | 12/2007 | Smith et al. | | |
| 2009/0245475 A1* | 10/2009 | Otani | .................... | H04M 3/085 379/27.03 |
| 2021/0051404 A1* | 2/2021 | Li | .......................... | H04M 9/082 |

FOREIGN PATENT DOCUMENTS

TW    201629505 A    8/2016

* cited by examiner

*Primary Examiner* — Alexander Krzystan
(74) *Attorney, Agent, or Firm* — Locke Lord LLP; Tim Tingkang Xia, Esq.

(57) ABSTRACT

A communication device is disclosed. The communication device includes a transceiver circuit, an echo canceler, and a processor. The transceiver circuit is configured to transmit a test signal to a channel. The echo canceler is configured to obtain a plurality of echo power of a reflected signal corresponding to the test signal. The processor is configured to obtain a plurality of positions on the channel according to a parameter value. The parameter value is N, a number of the plurality of positions is N, and the plurality of positions corresponds to the top N largest of the plurality of echo power. The echo canceler is further configured to eliminate part of the plurality of echo power corresponding to the plurality of positions according to the plurality of positions.

16 Claims, 4 Drawing Sheets

COMMUNICATION DEVICE AND ECHO CANCELLATION METHOD

CROSS-REFERENCE TO RELATED APPLICATION

This application claims the priority benefit of TAIWAN Application serial no. 108144793, filed Dec. 6, 2019, the full disclosure of which is incorporated herein by reference.

FIELD OF INVENTION

The invention relates to a communication device and an echo cancellation method. More particularly, the invention relates to a communication device and an echo cancellation method about a transmission channel.

BACKGROUND

In wired communication systems, echo canceler is often used to process the echo power in the channel. However, the better echo canceler requires a larger hardware volume. Generally speaking, in a channel, several echo power of the echo power (tap) position is small or extremely small and can be selectively ignored. Therefore, how to reduce the volume of the hardware while maintaining the echo processing effect is one of the problems to be improved.

SUMMARY

An aspect of this disclosure is to provide a communication device. The communication device includes a transceiver circuit, an echo canceler, and a processor. The transceiver circuit is configured to transmit a test signal to a channel. The echo canceler is configured to obtain a plurality of echo power of a reflected signal corresponding to the test signal. The processor is configured to obtain a plurality of positions on the channel according to a parameter value. The parameter value is N, a number of the plurality of positions is N, and the plurality of positions corresponds to the top N largest of the plurality of echo power. The echo canceler is further configured to eliminate part of the plurality of echo power corresponding to the plurality of positions according to the plurality of positions.

Another aspect of this disclosure is to provide a communication device. The communication device includes a transceiver circuit, an echo canceler, and a processor. The transceiver circuit, configured to transmit a test signal to a channel. The echo canceler is configured to obtain a plurality of echo power of a reflected signal corresponding to the test signal. The processor is configured to obtain a first position during a first time period. The first position corresponds to a first largest echo power, and the first largest echo power is the largest one of the plurality of echo power of the first time period, and after the echo canceler eliminates the first largest echo power, the processor is configured to obtain a second position during a second time period. The second position corresponds to a second largest echo power, and the second largest echo power is the largest one of the plurality of echo power during the second time period.

Another aspect of this disclosure is to provide an echo cancellation method. The echo cancellation method is suitable for a communication device. The echo cancellation method includes the following operations: transmitting a test signal to a channel coupled to the communication device by a transceiver circuit; obtaining a plurality of echo power (Tap) of a reflected signal corresponding to the test signal from the channel by an echo canceler; obtaining a first position corresponding to a first largest echo power during a first time period by a processor, wherein the first largest echo power is the largest one of the plurality of echo power during the first time period; eliminating the first largest echo power according to the first position by the echo canceler; obtaining a second position corresponding to a second largest echo power during a second time period by the processor, wherein the second largest echo power is the largest one of the plurality of echo power during the second time period; and eliminating the second largest echo power according to the second position by the echo canceler.

Embodiments of the present disclosure provide a communication device and an echo cancellation method, by searching the echo power to find the positions of the largest echo power and eliminating the largest echo power, the best effect on the reduction of echo power are introduced. In addition, by processing elimination process for only the largest echo power, the waste of echo canceler is avoided, and the hardware area and power consumption are reduced.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of elements and arrangements are described lower than to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed lower than, or elsewhere in the specification, to provide additional guidance to the practitioner regarding the description of the invention.

Figure 1:
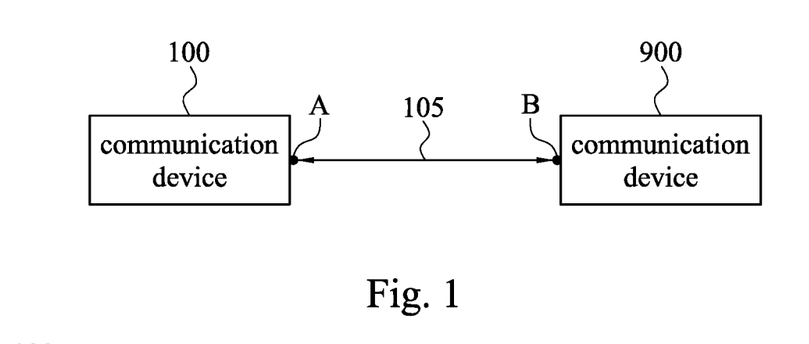
FIG. 1 is a schematic diagram illustrating a communication device according to some embodiments of the present disclosure.

FIG. 1 is a schematic diagram illustrating a communication device 100 according to some embodiments of the present disclosure. The communication device 100 communicates with another communication device 900 via a channel 105 to perform wired communication for transmitting and exchanging information. As shown in FIG. 1, channel 105 includes first end A and second end B. The first end A is the end that channel 105 coupled to the communication device 100, and the second end B is the end that channel the 105 coupled to the communication device 900. The communication device 100 or 900 is an independent or discrete device; it can be combined with/or coupled to another electronic device, such as a personal computer, a server, an electronic device for a car, or other devices that require wired transmission. The embodiments of the present disclosure are not limited thereto.

Figure 2:
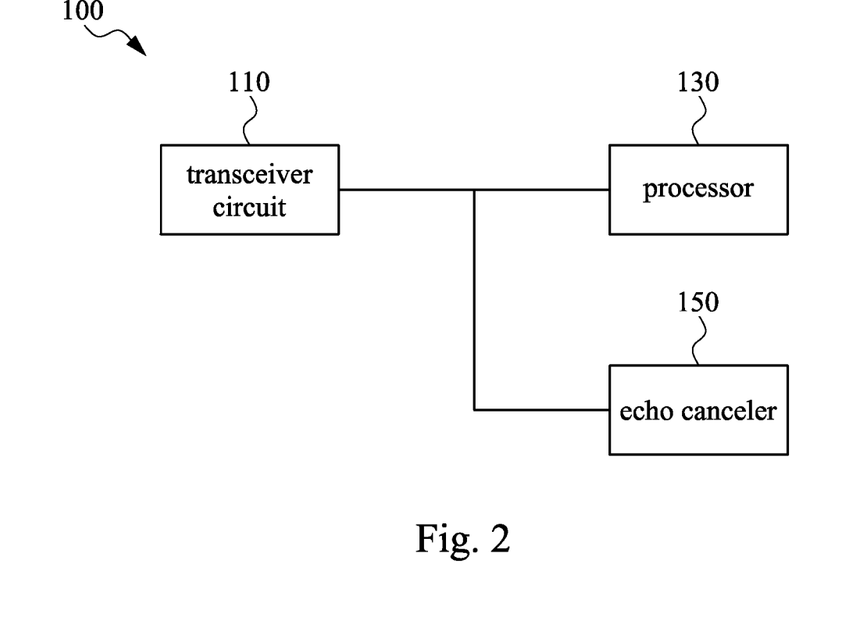
FIG. 2 is a schematic diagram illustrating a communication device according to some embodiments of the present disclosure.

FIG. 2 is a schematic diagram illustrating a communication device 100 according to some embodiments of the present disclosure. The communication device 100 includes a transceiver circuit 110, a processor 130, and an echo canceler 150. In the connection relationship, the transceiver circuit 110, the processor 130, and the echo canceler 150 are coupled to each other.

In the operation relationship, the transceiver circuit 110 is configured for data transmission with the communication device 900 shown in FIG. 1 via the channel 105. In some embodiments, the transceiver circuit 110 is configured to provide the communication device 100 to transmit a test signal to the end of the channel 105 coupled to the communication device 900, and the transceiver circuit 110 is used to provide the communication device 100 to receive a reflected signal corresponding to the test signal.

Figure 3:
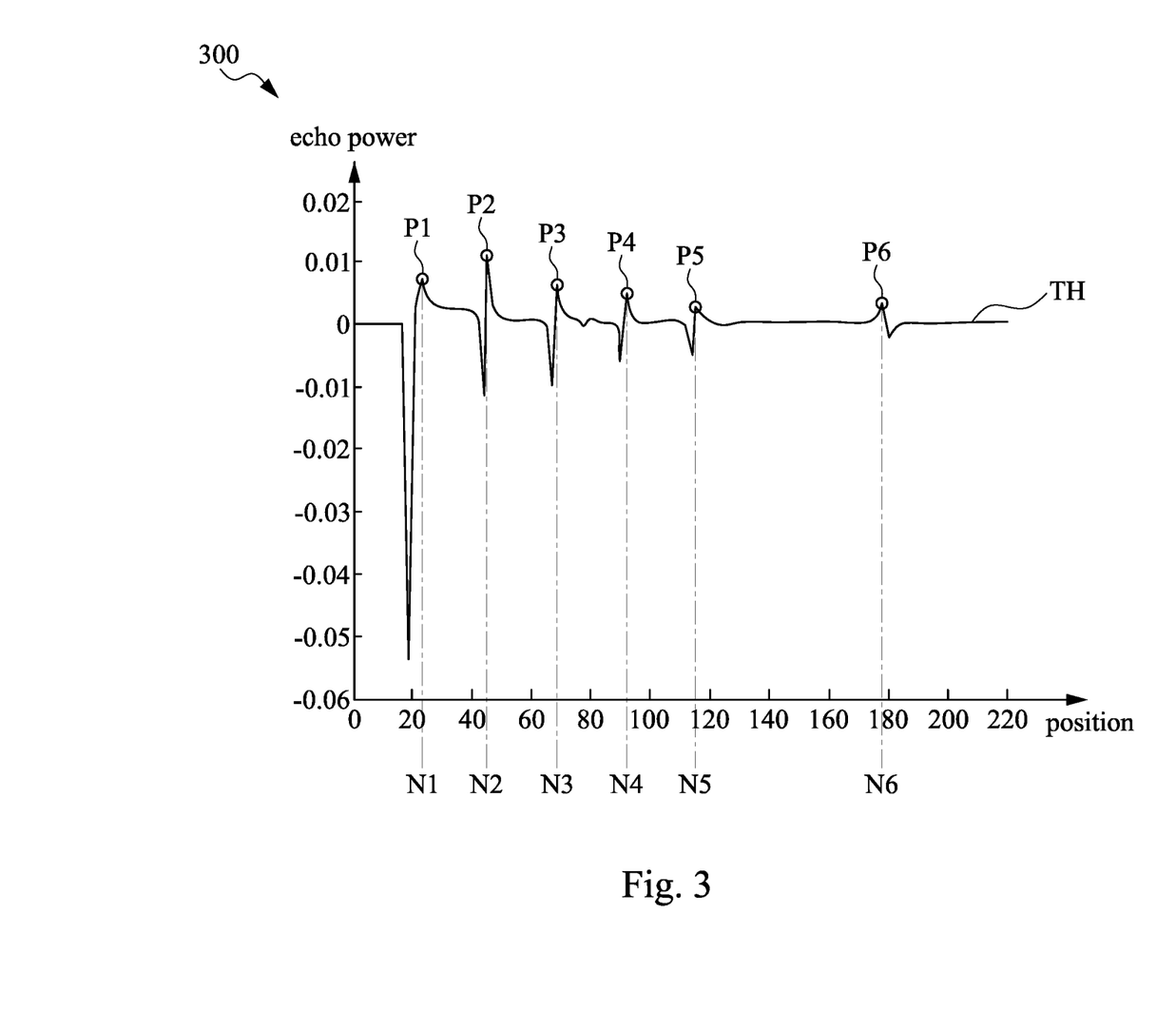
FIG. 3 is a schematic diagram illustrating an experimental data according to some embodiments of the present disclosure.

Reference is made to FIG. 3. FIG. 3 is a schematic diagram 300 illustrating an experimental data according to some embodiments of the present disclosure. As illustrated in FIG. 3, the reflected signal TH includes several echo powers P1 to P6, and each echo power P1 to P6 corresponds to one of the several positions N1 to N6, respectively. In detail, the echo power P1 corresponds to the position N1, the echo power P2 corresponds to the position N2, and so on. It should be noted that, the several positions N1 to N6 and the several echo power P1 to P6 described above are only used for illustration, and the embodiments of the present disclosure are not limited to the above.

In addition, in some embodiments, position 0 in FIG. 3 is the first end A of the channel 105 coupled to the communication device 100 as shown in FIG. 1, and position 220 is the second end B of the channel 105 coupled to the communication device 900 as shown in FIG. 1.

Reference is made to FIG. 1 and FIG. 2. In some embodiments, when the set parameter value is N, the processor 130 obtains N positions in channel 105 corresponding to the top N large echo power among the several echo powers according to the set parameter value N. Next, the echo canceler 150 eliminates the echo power corresponding to the N positions obtained by the processor 130.

For example, reference is made to FIG. 3. If the set parameter value is 6, the processor 130 obtains 6 positions N1 to N6 of the channel 105 corresponding to the top 6 large echo power P1 to P6. Next, the echo canceler 150 eliminates the echo power P1 to P6 corresponding to the positions N1 to N6 of the channel 105.

Figure 4:
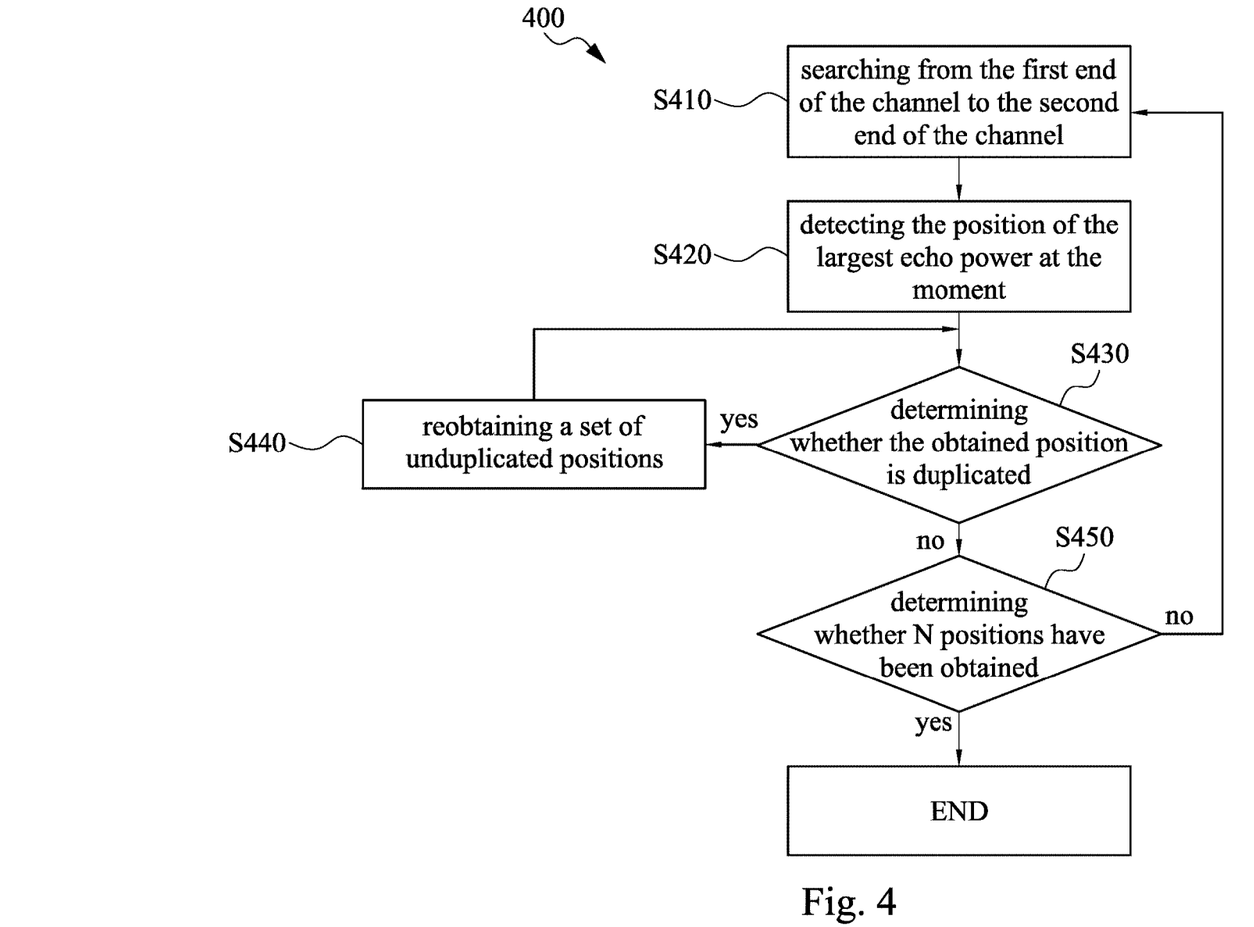
FIG. 4 is a schematic diagram illustrating an echo cancellation method according to some embodiments of the present disclosure.

Reference is made to FIG. 4. FIG. 4 is a schematic diagram illustrating an echo cancellation method 400 according to some embodiments of the present disclosure. However, the embodiments of the present disclosure are not limited thereto. It should be noted that, the echo cancellation method may be applied to a device with the same or similar structure as the communication device 100 in FIG. 2. For ease of illustration, the following will take FIG. 2 as an example to describe the operation method, and the embodiments of the present disclosure are not limited thereto.

In operation S410, searching from the first end of the channel to the second end of the channel. In some embodiments, operation S410 is performed by the processor 130 as shown in FIG. 2. Reference is made to FIG. 1 together. In some embodiments, as shown in FIG. 2, the processor 130 is searched from the first end A to the second end B of the channel 105.

In operation S420, detecting the position of the largest echo power at the moment. In some embodiments, operation S420 is performed by the processor 130 as shown in FIG. 2. For example, reference is made to FIG. 3 together. Assume that during the detection by processor 130, the echo power in channel 105 is not processed. At this time, the largest echo power detected by the processor 130 is echo power P2, and the position corresponding to the echo power P2 is position N2. In another embodiment, it is assumed that when the processor 130 performs detection, the echo power P2 has been processed by the echo canceler 150. At this time, the maximum echo power detected by the processor 130 is echo power P1, and the position corresponding to the echo power P1 is the position N1. In operation S420, the processor 130 further records the position of the largest detected echo power.

In operation S430, determining whether the obtained position is duplicated. In some embodiments, operation S430 is performed by the processor 130 as shown in FIG. 2. If the obtained positions are not duplicated, operation S450 is performed. If the obtained positions are duplicated, operation S440 is performed. In some embodiments, after the processor 130 obtains the position, the processor 130 compares whether the acquired position has been recorded or not.

In operation S440, reobtaining a set of unduplicated positions. In some embodiments, operation S440 is performed by the processor 130 as shown in FIG. 2. For example, reference is made to FIG. 3 together. If the processor 130 has recorded position N2, and the processor 130 still obtains the position N2 in operation S420, the processor 130 executes operation S440 to obtain the largest value of the echo power that is not duplicated with the position N2. In detail, as shown in FIG. 3, the largest value of echo power that does not duplicate with position N2 is echo power P1, and the processor 130 obtains position N1 corresponding to the echo power P1 in operation S440. In this way, the positions obtained and recorded in the echo cancellation method 400 are different from each other.

In operation S450, determining whether N positions have been obtained. In some embodiments, operation S450 is performed by the processor 130 as shown in FIG. 2. If N positions have been obtained, the echo cancellation method 400 ends. If N positions have not been obtained, operation S410 is performed. N in operation S450 refers to the parameter value set. For example, if the parameter value is 6, if the processor 130 determines that 6 positions have been obtained and recorded, the echo cancellation method 400 is ended. On the other hand, if the processor 130 determines that 6 positions have not been obtained and recorded, the processor 130 performs operation S410 to obtain the next position.

In some embodiments, in operation S450, the parameter value is set by the processor 130, and the parameter value is equal to the sum of the endpoint number of channel 105 and the connection point number of channel 105 in FIG. 1. For example, if channel 105 includes 4 connection points and 2 endpoints, the sum of the endpoint number of the channel 105 and the connection point number of the channel 105 is 6.

Figure 5:
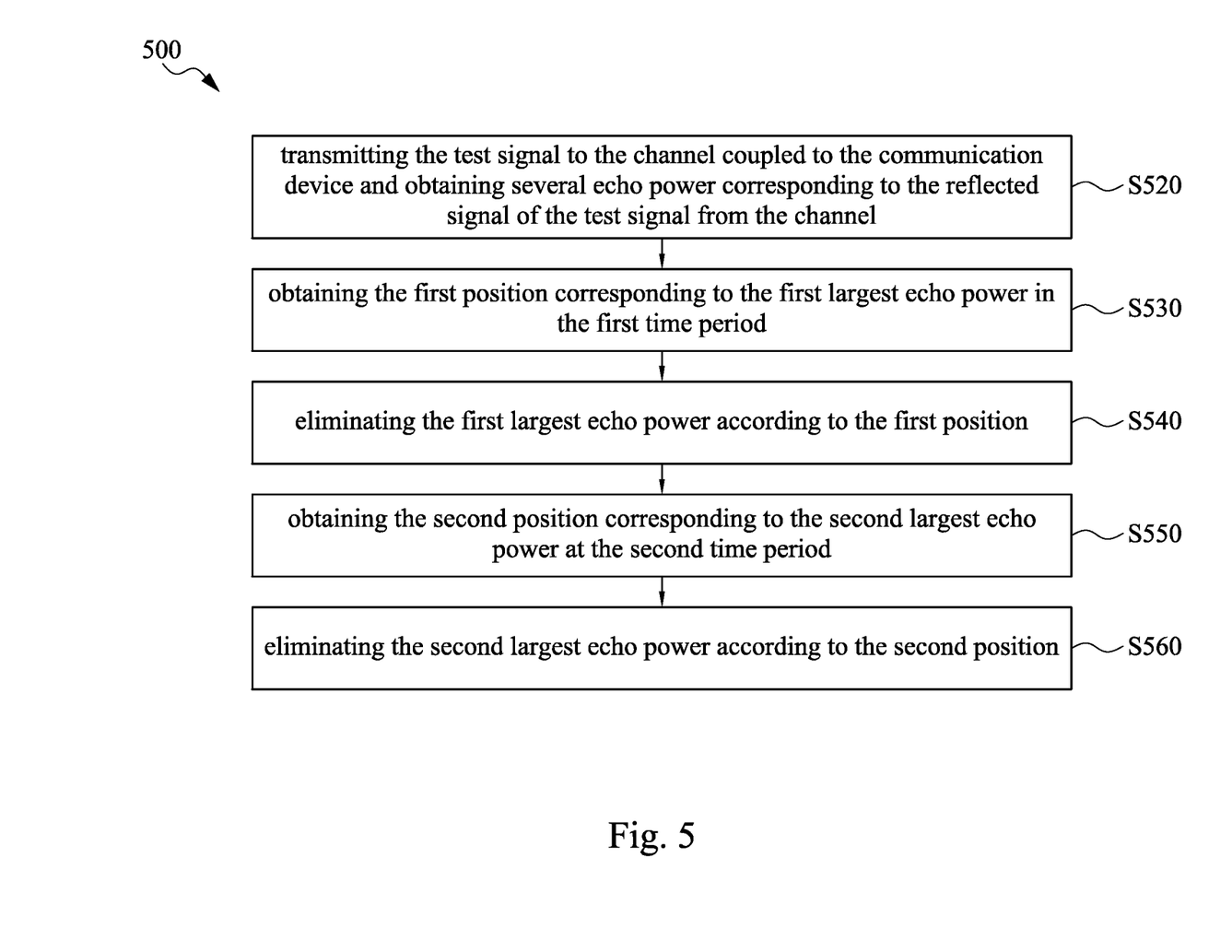
FIG. 5 is a schematic diagram illustrating an echo cancellation method according to some embodiments of the present disclosure.

Reference is made to FIG. 5. FIG. 5 is a schematic diagram illustrating an echo cancellation method 500 according to some embodiments of the present disclosure. However, the embodiments of the present disclosure are not limited thereto. It should be noted that, this echo cancellation method can be applied to devices with the same or similar structure as the communication device 100 in FIG. 2. For ease of illustration, the operation method will be described with FIG. 2 as an example, but the embodiments of the present disclosure are not limited thereto.

In operation S520, transmitting the test signal to the channel coupled to the communication device and obtaining several echo power corresponding to the reflected signal of the test signal from the channel. In some embodiments, in operation S520, the transceiver circuit 110 transmits a test signal to the channel 105 coupled between the communication device 100 and the communication device 900, and the echo canceler 150 obtains several echo power corresponding to the reflected signal of the test signal from the channel 105. Reference is made to FIG. 3 together. As shown in FIG. 3, the reflected signal TH includes several echo power P1 to P6.

In operation S530, obtaining the first position corresponding to the first largest echo power in the first time period, in which the first largest echo power is the largest one of the echo power during the first time period. In some embodiments, operation S530 is performed by the processor 130. For example, as shown in FIG. 3, during the first time period, the largest echo power of the channel 105 obtained by the processor 130 is echo power P2, and the position corresponding to the echo power P2 is position N2.

In operation S540, eliminating the first largest echo power according to the first position. In some embodiments, operation S540 is performed by the echo canceler 150. For example, during the first time period, the processor 130 obtains the largest echo power of the channel 105 is echo power P2, and the position corresponding to the echo power P2 is position N2, then the processor 130 eliminates the echo power P2 according to the position N2.

In operation S550, obtaining the second position corresponding to the second largest echo power at the second time period, in which the second largest echo power is the largest echo power during the second time period. In some embodiments, operation S550 is performed by the processor 130. For example, as shown in FIG. 3, in the second time period, since the echo power P2 has been eliminated by the echo canceler 150, at this time, the largest echo power obtained by the processor 130 from channel 105 is echo power P1, and the position corresponding to the echo power P1 is position N1.

In operation S560, eliminating the second largest echo power according to the second position. In some embodiments, operation S560 is performed by the echo canceler 150. For example, in the second time interval, the largest echo power of the channel 105 obtained by the processor 130 is echo power P1, and the position corresponding to the echo power P1 is position N1, and the processor 130 eliminates the echo power P1 according to the position N1.

In some embodiments, after executing operation S560, the processor 130 continues to find the next position corresponding to the largest echo power at that time, and the echo canceler 150 eliminates the maximum echo power at that time according to the position of the maximum echo power at that time. It should be noted that, the positions obtained and recorded by the processor 130 in different time intervals are different from each other.

In some examples, when the processor 130 determines that the position obtained and recorded has reached the number of the parameter value, the processor stops executing the echo cancellation method 500.

In some embodiments, if the processor 130 is not set with a parameter value, after performing operation S560, the processor 130 determines whether the signal to noise ratio changing value of the channel 105 is larger than the changing value threshold or not. If the signal to noise ratio changing value is larger than the changing value threshold, the processor 130 then obtains a third position corresponding to the third largest echo power during a third time period. The third largest echo power is the largest of the echo power on the channel during the third time period. On the other hand, if the signal to noise ratio changing value is not larger than the changing value threshold, no third position is obtained.

For example, assumed that the echo canceler 150 has eliminated the echo power P2 and the echo power P1, and after the echo canceler 150 eliminates the echo power P1, the processor 130 determines that the changing value between the signal to noise ratio of the channel 105 and the signal to noise ratio of the channel 105 before echo power P1 is eliminated is greater than the changing value threshold, and the processor 130 then obtains the third position corresponding to the third largest echo power during the third time period. Reference is made to FIG. 3, after the echo power P2 and the echo power P1 are eliminated, during the third time period, the largest echo power among the several echo power is echo power P3, and the position corresponding to echo power P3 is position N3. On the contrary, if the processor 130 determines that the changing value between the signal to noise ratio of the channel 105 and the signal to noise ratio of the channel 105 before eliminating the echo power P1 is not greater than the changing value threshold, the processor 130 ends the execution of the echo cancellation method 500.

In some embodiments, the processor 130 may be a server, a circuit, a central processor unit (CPU), or a micro processor with functions such as storage, calculation, data reading, receiving signals or messages, transmitting signals or messages, etc., or other circuits with equivalent functions. In some embodiments, the echo cancellation circuit 150 may be an echo cancellation function or other equivalent circuits. In some embodiments, the transceiver circuit 110 may be a circuit having a function of receiving a signal or a message, transmitting a signal or a message, or the like.

According to embodiments of the present disclosure, it is understood that the embodiments of the present disclosure provide a communication device and an echo cancellation method, by searching the echo power to find the positions of the largest echo power and eliminating the largest echo power, the best effect on the reduction of echo power are introduced. In addition, by processing elimination process for only the largest echo power, the waste of echo canceler is avoided, and the hardware area and power consumption are reduced.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication device, comprising:
   a transceiver circuit, configured to transmit a test signal to a channel;
   an echo canceler, configured to obtain a plurality of echo power of a reflected signal corresponding to the test signal; and
   a processor, configured to determine a parameter value to be N, and to obtain a plurality of positions of the top N largest of the plurality of echo power on the channel according to the parameter value, a number of the plurality of positions is N;
   wherein the echo canceler is further configured to eliminate part of the plurality of echo power corresponding to the plurality of positions according to the plurality of positions;
   wherein the processor is configured to obtain a first position of the plurality of positions during a first time period, wherein the first position corresponds to a first largest echo power, and the first largest echo power is the largest one of the plurality of echo power during the first time period, wherein the echo canceler is further configured to eliminate the first largest echo power according to the first position;
   wherein when the first largest echo power is eliminated, the processor obtains a second position of the plurality of positions during a second time period, wherein the second position corresponds to a second largest echo power, the second largest echo power is a largest one of the plurality of echo power during the second time period, wherein the echo canceler is further configured to eliminate the second largest echo power according to the second position;
   wherein after the echo canceler eliminates the second largest echo power, if a signal to noise ratio of the channel is larger than a changing value threshold, the processor is further configured to obtain a third position during a third time period, wherein the third position corresponds to a third largest echo power, and the third largest echo power is the largest one of the plurality of echo power during the third time period.

2. The communication device of claim 1, wherein the processor is further configured to search from a first end of the channel to a second end of the channel.

3. The communication device of claim 1, wherein the processor is further configured to set the parameter value, wherein the parameter value is equal to a sum of an endpoint number of the channel and a connection point number of the channel.

4. The communication device of claim 1, wherein the processor is further configured to record the plurality of positions.

5. The communication device of claim 1, wherein the plurality of positions are different from each other.

6. A communication device, comprising:
   a transceiver circuit, configured to transmit a test signal to a channel;
   an echo canceler, configured to obtain a plurality of echo power of a reflected signal corresponding to the test signal; and
   a processor, configured to obtain a first position during a first time period, wherein the first position corresponds to a first largest echo power, and the first largest echo power is the largest one of the plurality of echo power of the first time period, and after the echo canceler eliminates the first largest echo power according to the first position, the processor is configured to obtain a second position during a second time period, wherein the second position corresponds to a second largest echo power, and the second largest echo power is the largest one of the plurality of echo power during the second time period, and the second largest echo power is eliminated by the echo canceler;
   wherein after the echo canceler eliminates the second largest echo power, if a signal to noise ratio of the channel is larger than a changing value threshold, the processor is further configured to obtain a third position during a third time period, wherein the third position corresponds to a third largest echo power, and the third largest echo power is the largest one of the plurality of echo power during the third time period.

7. The communication device of claim 6, wherein after the echo canceler eliminates the second largest echo power, if the signal to noise ratio of the channel is not larger than the changing value threshold, the processor is further configured to not to obtain the third position.

8. The communication device of claim 6, wherein the first position, the second position and the third position are different from each other.

9. An echo cancellation method, suitable for a communication device, comprising:
   transmitting a test signal to a channel coupled to the communication device by a transceiver circuit;
   obtaining a plurality of echo power (Tap) of a reflected signal corresponding to the test signal from the channel by an echo canceler;
   obtaining a first position corresponding to a first largest echo power during a first time period by a processor, wherein the first largest echo power is the largest one of the plurality of echo power during the first time period;
   eliminating the first largest echo power according to the first position by the echo canceler;
   obtaining a second position corresponding to a second largest echo power during a second time period by the processor, wherein the second largest echo power is the largest one of the plurality of echo power during the second time period;
   eliminating the second largest echo power according to the second position by the echo canceler;
   determining whether a signal to noise ratio changing value of the channel is larger than a changing value threshold after eliminating the second largest echo power; and
   obtaining a third position corresponding to a third largest echo power during a third time period if the signal to noise ratio changing value is larger than the changing value threshold, wherein the third largest echo power is the largest one of a plurality of echo power of the channel during the third time period.

10. The echo cancellation method of claim 9, comprising:
setting a parameter value, wherein the parameter value is N; and
obtaining the first position to a N-th position of the channel by the processor, wherein the first position to the N-th position respectively corresponds to the largest one of the plurality of echo power of the first time period to a N-th time period.

11. The echo cancellation method of claim 10, wherein the parameter value is equal to a sum of an endpoint number of the channel and a connection point number of the channel.

12. The echo cancellation method of claim 9, comprising:
recording the first position and the second position.

13. The echo cancellation method of claim 9, wherein the second position is different from the first position.

14. The echo cancellation method of claim 9, further comprising:
not obtaining the third position if the signal to noise ratio changing value is not larger than the changing value threshold.

15. The echo cancellation method of claim 9, wherein detecting a first position corresponding to a first largest echo power further comprising:
searching from a first end of the channel to a second end of the channel.

16. The echo cancellation method of claim 9, further comprising:
determining whether the second position is the same as the first position or not; and
re-detecting to obtain the second position different from the first position when the second position is the same as the first position.

* * * * *

UNITED STATES PATENT AND TRADEMARK OFFICE
CERTIFICATE OF CORRECTION

| | |
|---|---|
| PATENT NO. | : 11,277,168 B2 |
| APPLICATION NO. | : 17/014110 |
| DATED | : March 15, 2022 |
| INVENTOR(S) | : Wei-Ting Lin et al. |

Page 1 of 1

It is certified that error appears in the above-identified patent and that said Letters Patent is hereby corrected as shown below:

On the Title Page

Item (30): reading:
"Dec. 6, 2019 (TW) .................... 10814479.3"
Should read as follows:
-- Dec. 6, 2019 (TW) .................... 108144793 --

Signed and Sealed this
Nineteenth Day of July, 2022

*Katherine Kelly Vidal*

Katherine Kelly Vidal
*Director of the United States Patent and Trademark Office*